// 
US010726548B2

United States Patent
Cadieu et al.

(10) Patent No.: US 10,726,548 B2
(45) Date of Patent: Jul. 28, 2020

(54) CONFIDENCE DETERMINATION IN A MEDICAL IMAGING VIDEO CLIP MEASUREMENT BASED UPON VIDEO CLIP IMAGE QUALITY

(71) Applicant: Bay Labs, Inc., San Francisco, CA (US)

(72) Inventors: Charles Cadieu, San Francisco, CA (US); Ha Hong, Pleasant Hill, CA (US); Kilian Koepsell, San Francisco, CA (US); Nicolas Poilvert, Seattle, WA (US); Michael G. Cannon, Haverford, PA (US); Nathanael Romano, San Francisco, CA (US); Ching Hsieh, Saratoga, CA (US); Samuel Surette, San Francisco, CA (US); Natalia Bilenko, Oakland, CA (US)

(73) Assignee: BAY LABS, INC., San Francisco, CA (US)

( * ) Notice: Subject to any disclaimer, the term of this patent is extended or adjusted under 35 U.S.C. 154(b) by 207 days.

(21) Appl. No.: 16/017,757

(22) Filed: Jun. 25, 2018

(65) Prior Publication Data

US 2019/0392577 A1    Dec. 26, 2019

(51) Int. Cl.
*G06K 9/00* (2006.01)
*G06T 7/00* (2017.01)

(52) U.S. Cl.
CPC ........ *G06T 7/0012* (2013.01); *G06T 2200/24* (2013.01); *G06T 2207/10016* (2013.01); *G06T 2207/30168* (2013.01)

(58) Field of Classification Search
CPC ....... G06T 2200/24; G06T 2207/10016; G06T 2207/30168; G06T 7/0012
See application file for complete search history.

(56) References Cited

U.S. PATENT DOCUMENTS

| | | | |
|---|---|---|---|
| 6,272,233 B1 * | 8/2001 | Takeo | G06T 5/20 |
| | | | 128/922 |
| 8,879,813 B1 * | 11/2014 | Solanki | G16H 30/20 |
| | | | 382/128 |
| 2005/0251013 A1 * | 11/2005 | Krishnan | G06T 7/0012 |
| | | | 600/407 |
| 2007/0258631 A1 | 11/2007 | Friedman et al. | |
| 2011/0170755 A1 * | 7/2011 | Buelow | G06T 7/0012 |
| | | | 382/128 |

(Continued)

*Primary Examiner* — Tom Y Lu
(74) *Attorney, Agent, or Firm* — Steven M. Greenberg, Esq.; Shutts & Bowen LLP

(57) ABSTRACT

Embodiments of the present invention provide a method, system and computer program product for video clip quality determination in medical device imaging and diagnosis. In an embodiment of the invention, a method for video clip quality determination in medical imaging includes first retrieving from a data store into memory of a host computer, video clip imagery of a target organ. Then, a quality value assigned to the video clip imagery may be identified in connection with the retrieved video clip imagery. A measurement of the target organ is computed based upon the retrieved video clip imagery. Finally, a confidence in respect to the computed measurement is determined based upon the identified quality value and the confidence determination displayed in a user interface provided by the host computer.

15 Claims, 2 Drawing Sheets

(56) References Cited

U.S. PATENT DOCUMENTS

| | | | |
|---|---|---|---|
| 2011/0228997 A1 | 9/2011 | Sharp et al. | |
| 2011/0246521 A1 | 10/2011 | Luo et al. | |
| 2012/0008838 A1* | 1/2012 | Guyon | G06T 7/66 382/128 |
| 2013/0190600 A1* | 7/2013 | Gupta | A61B 8/0866 600/410 |
| 2015/0116361 A1 | 4/2015 | Braun et al. | |
| 2017/0273669 A1* | 9/2017 | Schneider | G06T 5/50 |
| 2017/0372155 A1* | 12/2017 | Odry | G06K 9/03 |
| 2018/0144214 A1* | 5/2018 | Hsieh | G06K 9/036 |
| 2018/0225820 A1* | 8/2018 | Liang | G06T 7/0012 |

* cited by examiner

CONFIDENCE DETERMINATION IN A MEDICAL IMAGING VIDEO CLIP MEASUREMENT BASED UPON VIDEO CLIP IMAGE QUALITY

BACKGROUND OF THE INVENTION

Field of the Invention

The present invention relates to the field of medical imaging and diagnosis and more particularly to video clip selection for use in medical imaging and diagnosis.

Description of the Related Art

Medical imaging refers to the process of creating a visual representation of an interior portion of a mammalian body for the purpose of clinical analysis and medical intervention. Medical imaging seeks to reveal internal structures hidden by the exterior of the body so as to facilitate the diagnosis and treatment of disease. Medical imaging incorporates several different modalities for image acquisition. Common modalities include radiological devices such as X-ray radiography including computerized tomography (CT), magnetic resonance imaging (MRI), medical ultrasonography or ultrasound, endoscopy, elastography, tactile imaging, thermography, medical photography and nuclear medicine functional imaging techniques as positron emission tomography (PET) and Single-photon emission computed tomography (SPECT). Depending upon the desired use of the imagery for the purpose of a medical diagnosis or the targeting of specific tissue or a particular organ or portion of an organ, different modalities for different imagery may be preferred.

Medical imaging of a target area of the body may be achieved from many different views. Strictly speaking, in so far as medical imagery may be two-dimensional, or three-dimensional in nature, the angle and approach of the imaging device will result in a different perspective view of the target area. As in the case of the modality of medical imaging, a particular view of the target area presented in a medical image may be preferred depending upon the desired use of the imagery for the purpose of a medical diagnosis or the targeting of specific tissue or a particular organ or portion thereof.

Finally, medical imaging of a target area of the body may vary in quality. That is to say, depending upon the operator—usually a technician and not the physician ultimately producing a diagnosis based upon the imagery—the clarity and focal point of a medical image may vary. In some instances, an attempted view of a target organ may be incomplete omitting key features of the target organ from the view due to an improper placement of the imaging sensor. In other instances, external factors such as the anatomical features of the body may inhibit clarity of key features of the target organ despite proper placement of the imaging sensor.

The traditional workflow for medical imaging begins with the use of the imaging modality by a technician upon the patient in order to acquire a set of imagery. The imagery may be still imagery or video clip imagery depending upon the modality. Generally, the technician enjoys an awareness of the ultimate purpose of the imagery so as to diagnose a particular disease or dysfunction of a target organ. Once acquired, the set of imagery is stored in a centralized repository, typically referred to as a "PACS" or "Picture Archival Communications System" and a report, either digital or written, is prepared for review by the physician. The physician then retrieves at a later time the set of imagery and the report and conducts an analysis of the imagery. The analysis generally requires the physician to select the most appropriate images in the set of imagery of the correct views and quality.

This process can be quite tedious—especially given the need for the physician not only to select the correct images of the correct views and quality, but also to efficiently arrange on the display screen the correct images so as to facilitate a diagnosis through the concurrent review of multiple different images of interest. To the extent that the requisite quality of an image does not exist in the set of imagery, but is required, or to the extent that the requisite view of an image does not exist in the set of imagery, the physician must then direct the patient to return for an additional appointment for the technician to re-acquire the missing imagery. So much extra effort reflects an enormous waste of resources of the patient, health care facility and physician.

BRIEF SUMMARY OF THE INVENTION

Embodiments of the present invention address deficiencies of the art in respect to clip selection for medical imaging and provide a novel and non-obvious method, system and computer program product for video clip quality determination in medical device imaging and diagnosis. In an embodiment of the invention, a method for video clip quality determination in medical imaging includes first retrieving from a data store into memory of a host computer, video clip imagery of a target organ. Then, a quality value assigned to the video clip imagery may be identified in connection with the retrieved video clip imagery. A measurement of the target organ is computed based upon the retrieved video clip imagery. Finally, a confidence in respect to the computed measurement is determined based upon the identified quality value and the confidence determination displayed in a user interface provided by the host computer.

In one aspect of the embodiment, the method additionally includes the selection of the video clip imagery of the target organ from amongst a multiplicity of video clip imagery for retrieval into the memory according to a highest specified quality value assigned to the selected video clip imagery. In another aspect of the embodiment, the confidence determination is higher responsive to a correspondingly higher identified quality value. In yet another aspect of the embodiment, the selected video clip imagery indicates a specified view of the target organ and also a correspondingly assigned quality value. Finally, in even yet another aspect of the embodiment, a determination is made whether or not the confidence value falls below a threshold so as to indicate insufficient quality requisite to compute the measurement and the determination is displayed in the user interface.

In another embodiment of the invention, a data processing system is adapted for medical imaging and configured for video clip quality determination in medical imaging. The system includes a host computer with memory and at least one processor, a data store video clip imagery of a target organ coupled to the host computer, and a video clip quality determination module. The module includes computer program instructions executing in the memory of the host computer. The instructions when executed by the processor retrieve from the data store into the memory of the host computer, video clip imagery of a target organ and identify in connection with the retrieved video clip imagery, a quality value assigned to the video clip imagery. The instructions during execution further compute a measurement of the target organ based upon the retrieved video clip imagery and determine a confidence in respect to the computed measurement based upon the identified quality value. Finally, the instructions during execution display the confidence determination in a user interface provided by the host computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for video clip quality determination. In accordance with an embodiment of the invention, video clip imagery of a specified target organ may be retrieved from a data store in which different sets of video clip imagery are stored in respect to different target organs. Each set of video clip imagery has a different quality value associated therewith. The retrieved video clip imagery has associated therewith the highest quality value amongst the different quality values for the sets of video clip imagery in the data store for the target organ. A measurement of the target organ is then computed based upon the retrieved video clip imagery and displayed in a user interface of a display of a host computer. As well, a confidence is determined based upon the quality value for the retrieved video clip imagery and displayed in the user interface. Finally, to the extent that the determined confidence falls below a minimum confidence necessary to compute the measurement, an alert is displayed in the user interface.

Figure 1:
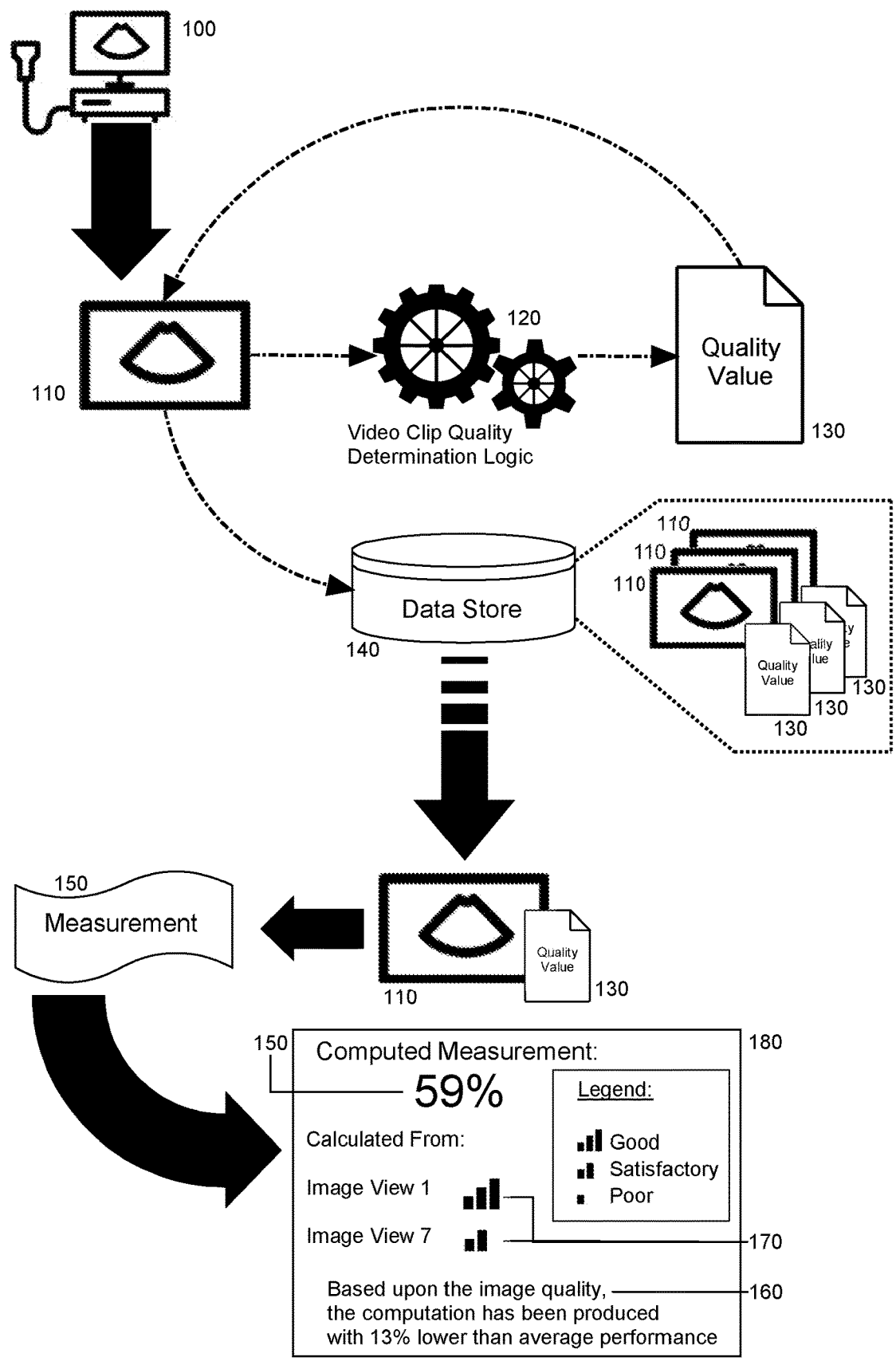
FIG. 1 is a pictorial illustration of a process for video clip quality determination for medical imaging.

In further illustration, FIG. 1 pictorially shows a process for video clip quality determination for medical imaging. As shown in FIG. 1, different video clips 110 of a target organ are stored in a data store 140. As new ones of the video clips 110 are received from an imaging device 100 and added to the data store 140, video clip quality determination logic 120 determines a quality value 130 therefor. For instance, the video clip quality determination logic 120 determines a quality value 130 for a new one of the video clips 110 by determining within the new one of the video clips 110 if certain recognizable structures for the target organ are present in the new one of the video clips 110, such as certain anatomical features expected to be present in a properly acquired view of the target organ. For a greater number and higher clarity of the expected anatomical features, the video clip quality determination logic 120 assigns a higher quality value 130 to the new one of the video clips, for example a number corresponding to medical guidelines such as the American College of Emergency Physicians (ACEP) scoring system for quality of an ultrasonographic image. In this way, each one of the video clips 110 in the data store has associated therewith, a corresponding quality value 130.

Subsequently, one or more of the video clips 110 may be selected for use in computing a measurement 150 requisite to a medical diagnosis pertaining to the target organ. The computed measurement 150 may then be displayed in a user interface 180 to the video clip quality determination logic 120. As well, the identity of the one or more video clips 110 may be displayed in the user interface 180 along with a graphical icon 180 corresponding to a quality value for each of the one or more video clips 110 so that a reviewing physician may understand the nature of the imagery used in computing the measurement 150. As shown in FIG. 1, the graphical icon may be a bar chart of increasing magnitudes such that more bars in the bar chart correlate to better quality.

One bar indicates that no recognizable structures are present in a corresponding one of video clips 110 and thus no objective data may be gathered from the corresponding one of video clips 110 as in the case of an ACEP score of one. As well, one bar may indicate that while there may exist in the corresponding one of video clips 110 minimally recognizable structures, the number of structures that are recognizable are insufficient to perform the diagnosis based upon the computed measurement 150 as in the case of an ACEP score of two. Two bars, in turn, indicates that the minimal criteria have been met for diagnosis with a requisite number of recognizable structures, but still the clarity of the corresponding one of video clips 110 is not optimum, as in the case of an ACEP score of three. Finally, three bars indicate that the criteria have been met for diagnosis, with all structures imaged well and diagnosis easily supported as in the case of an ACEP score of four. Three bars may also indicate that the minimal criteria have been met for diagnosis, that all structures have been imaged with excellent image quality and diagnosis and that the diagnosis associated with the computed measurement 150 is completely supported by the corresponding one of the video clips 110 as in an ACEP score of five.

Most importantly, however, a confidence 160 in the measurement 150 may be displayed in the user interface 180. In this regard, the confidence 160 is a value computed based upon the quality value 130 for each of the video clips 110 used in computing the measurement 150. The confidence 160 may be a metric computed for the assignment of the quality value 130 to the corresponding one of the video clips 110 relative to an image quality score, for example, an ACEP score, assigned to a similar image of similar quality in a previously collected set of video clips with correspondingly assigned ACEP scores. Consequently, the confidence 160 indicates the ability of the physician to rely upon the measurement as a direct result of the quality of the ones of the video clips 110 used to compute the measurement 150.

Figure 2:
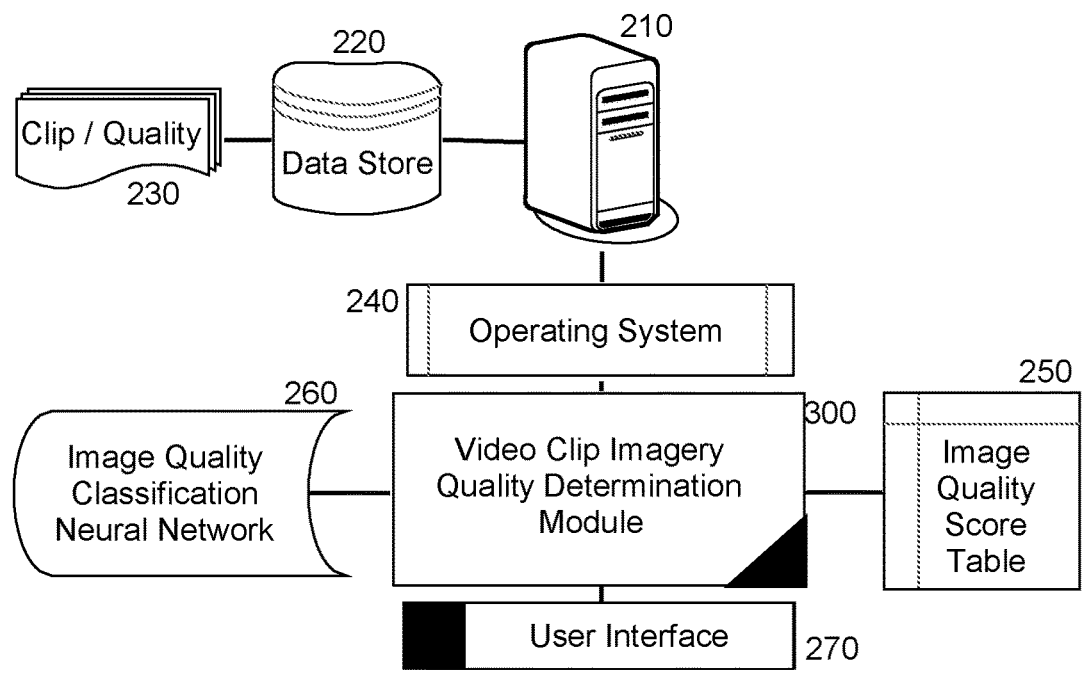
FIG. 2 is a schematic illustration of a data processing system configured for video clip quality determination for medical imaging; and, FIG. 3 is a flow chart illustrating a process for video clip quality determination for medical imaging.

The process described in connection with FIG. 1 may be implemented in a data processing system. In yet further illustration, FIG. 2 schematically shows a data processing system configured for video clip quality determination for medical imaging. The system includes a host computer 210 with memory and at least one processor and is coupled to a data store 220 storing therein, different video clips 230 of different target organs, each clip having an associated quality value. An operating system 240 executes in the memory of the host computer 210 and supports the operation of a video clip imagery quality determination module 300 and manages the display of a user interface 270 to the video clip imagery quality determination module 300.

The video clip imagery quality determination module 300 includes computer program instructions that when executing in the memory of the host computer 210, are enabled to receive each of the video clips 230 in the data store 220 and to assign a quality value thereto. For instance, a deep neural network 260 may be trained on a training set of video clips of a corresponding target organ, each with a known quality. Thereafter, the video clip imagery quality determination module 300 may submit newly received ones of the video clips 230 for storage in the data store 220 and may submit each received one of the video clips 230 to the neural network 260 in order to assign a corresponding quality value.

The program instructions of the video clip imagery quality determination module 300 also are enabled to facilitate the selection of one of the video clips 230 stored in the data store 220 for use in computing a measurement directed to a corresponding target organ. In this regard, for each view required to properly compute the measurement, a video clip of highest associated quality value may be selected. Upon the selection, the program instructions of the video clip imagery quality determination module 300 retrieve that associated quality value for display in the user interface 270 along with the computed measurement. In this regard, an ACEP score table 250 or similar table may be used to correlate the associated quality value with an iconographic representation of the associated quality value for placement in the user interface 270.

Finally, the program instructions of the video clip imagery quality determination module 300 are enabled to determine a confidence for the computed measurement displayed in the user interface 270 based upon a comparison of the associated quality of the selected one of the video clips 230, and a previously, manually assigned quality of a video clip of similar quality to that of the selected one of the video clips 230. In this way, the physician receiving the computed measurement will have an indication of the quality of the selected one of the video clips 230 used to compute the measurement, and a confidence in that measurement relative to having performed the measurement without the assistance of the video clip imagery quality determination module 300.

More particularly, the confidence for the computed measurement quantifies an expected accuracy of the computed measurement based upon the image quality comparison between the quality of the video clips 230 used to compute the measurement and the quality of similar images previously utilized in computing the measurement through means alternative to those of the computed measurement. The comparison focuses, for example, upon image feature attributes known to correlate to the accuracy of measurements. For example, those feature attributes may be recorded tabularly from past knowledge correlating known accurate measurements with images having certain feature attributes of certain anatomical structures such as a clearly defined and visible border of a structure present in an image. Alternatively, those feature attributes may be identified in an automated way correlating one or more pixel elements of an image through a neural network or machine learning process trained for a series of images a priori known to have produced a corresponding accurate measurement.

In this way, the diagnostician receiving the computed measurement will have an indication as to how reliable the computed measurement might be based upon the comparison of image quality. Without such a comparison, the physician is required to expend extra effort and time reviewing image features of the image used to compute the measurement in order to subjectively assess the suitability of the image for measurement.

Figure 3:
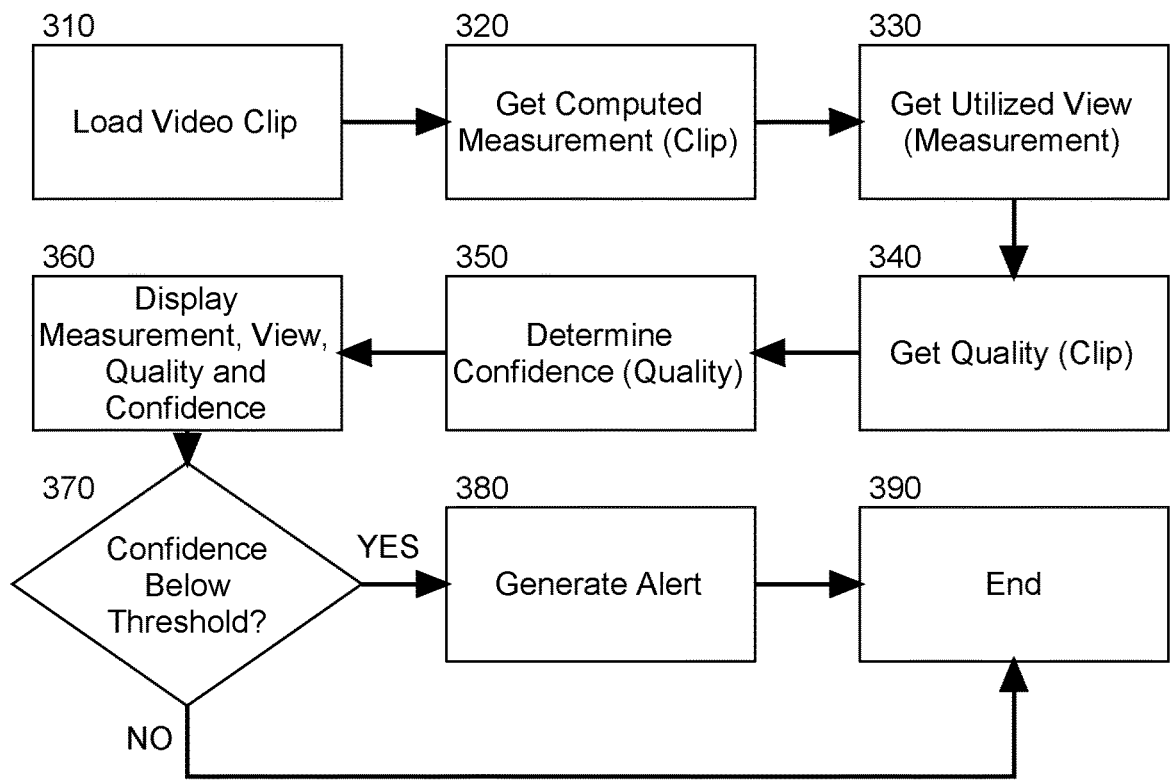

In even yet further illustration of the operation of the video clip imagery quality determination module 300, FIG. 3 is a flow chart illustrating a process for video clip quality determination for medical imaging. Beginning in block 310, a video clip is loaded into memory for use in computing a measurement in the diagnosis of a corresponding target organ. In block 320, a computed measurement is then received in memory based upon the selected one of the video clips and a view for the selected one of the video clips used in computing the measurement determined in block 330. In block 340, an associated quality value is retrieved in memory in connection with the selected one of the video clips. Thereafter, in block 350 a confidence is determined based upon the associated quality value.

In this regard, the selected one of the images may be submitted to a neural network trained to correlate the selected one of the video clips with a video clip of similar quality annotated with a particular ACEP score. A relative performance metric is then computed as a percent ratio of the associated quality value to the annotated ACEP score of the similar video clip. The metric may be expressed textually as "equal to average performance" when the associated quality value is within five percent of a value derived from the particular ACEP score of the video clip of similar quality, or "better than average performance" when the associated quality value is more than five percent greater than that of the value derived from the particular ACEP score, or "lower than average performance" when the associated quality value is more than five percent less than that of the value derived from the particular ACEP score.

Once the confidence has been determined in block 350, in block 360, each for the computed measurement, the video clips selected for use in computing the measurement, the associated quality value for each one of the selected video clips, and the confidence are displayed in a user interface. In decision block 370, if the confidence is determined to fall below an acceptable threshold, in block 380 an alert is generated in the user interface. In either circumstance, in block 390 the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for video clip quality determination in medical imaging, the method comprising:
   retrieving from a data store into memory of a host computer, video clip imagery of a target organ;
   identifying in connection with the retrieved video clip imagery, a quality value assigned to the video clip imagery;
   computing a measurement of the target organ based upon the retrieved video clip imagery;
   determining a confidence in respect to the computed measurement based upon the identified quality value; and,
   displaying the confidence determination in a user interface provided by the host computer.

2. The method of claim 1, further comprising selecting the video clip imagery of the target organ from amongst a multiplicity of video clip imagery for retrieval into the memory according to a highest specified quality value assigned to the selected video clip imagery.

3. The method of claim 1, wherein the confidence determination is higher responsive to a correspondingly higher identified quality value.

4. The method of claim 1, wherein the selected video clip imagery indicates a specified view of the target organ and also a correspondingly assigned quality value.

5. The method of claim 1, wherein a determination is made whether or not the confidence value falls below a threshold so as to indicate insufficient quality requisite to compute the measurement and the determination is displayed in the user interface.

6. A data processing system adapted for medical imaging and configured for video clip quality determination in medical imaging, the system comprising:
   a host computer with memory and at least one processor;
   a data store video clip imagery of a target organ coupled to the host computer; and,
   a video clip quality determination module comprising computer program instructions executing in the memory of the host computer, the instructions when executed by the processor performing:
   retrieving from the data store into the memory of the host computer, video clip imagery of a target organ;
   identifying in connection with the retrieved video clip imagery, a quality value assigned to the video clip imagery;

computing a measurement of the target organ based upon the retrieved video clip imagery;

determining a confidence in respect to the computed measurement based upon the identified quality value; and, displaying the confidence determination in a user interface provided by the host computer.

7. The system of claim 6, wherein the program instructions further perform selecting the video clip imagery of the target organ from amongst a multiplicity of video clip imagery for retrieval into the memory according to a highest specified quality value assigned to the selected video clip imagery.

8. The system of claim 6, wherein the confidence determination is higher responsive to a correspondingly higher identified quality value.

9. The system of claim 6, wherein the selected video clip imagery indicates a specified view of the target organ and also a correspondingly assigned quality value.

10. The system of claim 6, wherein a determination is made whether or not the confidence value falls below a threshold so as to indicate insufficient quality requisite to compute the measurement and the determination is displayed in the user interface.

11. A computer program product for video clip quality determination in medical imaging, the computer program product including a non-transitory computer readable storage medium having program instructions embodied therewith, the program instructions executable by a device to cause the device to perform a method including:

retrieving from a data store into memory of a host computer, video clip imagery of a target organ;

identifying in connection with the retrieved video clip imagery, a quality value assigned to the video clip imagery;

computing a measurement of the target organ based upon the retrieved video clip imagery;

determining a confidence in respect to the computed measurement based upon the identified quality value; and, displaying the confidence determination in a user interface provided by the host computer.

12. The computer program product of claim 11, further comprising selecting the video clip imagery of the target organ from amongst a multiplicity of video clip imagery for retrieval into the memory according to a highest specified quality value assigned to the selected video clip imagery.

13. The computer program product of claim 11, wherein the confidence determination is higher responsive to a correspondingly higher identified quality value.

14. The computer program product of claim 11, wherein the selected video clip imagery indicates a specified view of the target organ and also a correspondingly assigned quality value.

15. The computer program product of claim 11, wherein a determination is made whether or not the confidence value falls below a threshold so as to indicate insufficient quality requisite to compute the measurement and the determination is displayed in the user interface.

* * * * *